(12) United States Patent
Orishima et al.

(10) Patent No.: US 9,947,951 B2
(45) Date of Patent: Apr. 17, 2018

(54) FUEL CELL MODULE

(71) Applicant: SUMITOMO PRECISION PRODUCTS CO., LTD., Hyogo (JP)

(72) Inventors: Hiroshi Orishima, Amagasaki (JP); Akihito Doi, Amagasaki (JP)

(73) Assignee: SUMITOMO PRECISION PRODUCTS CO., LTD., Hygo (JP)

( * ) Notice: Subject to any disclaimer, the term of this patent is extended or adjusted under 35 U.S.C. 154(b) by 184 days.

(21) Appl. No.: 14/768,693

(22) PCT Filed: Feb. 25, 2014

(86) PCT No.: PCT/JP2014/054556
§ 371 (c)(1),
(2) Date: Aug. 18, 2015

(87) PCT Pub. No.: WO2014/129656
PCT Pub. Date: Aug. 28, 2014

(65) Prior Publication Data
US 2015/0380756 A1 Dec. 31, 2015

(30) Foreign Application Priority Data
Feb. 25, 2013 (JP) .................................. 2013-034625

(51) Int. Cl.
*H01M 8/04* (2016.01)
*H01M 8/0612* (2016.01)
(Continued)

(52) U.S. Cl.
CPC ..... *H01M 8/0618* (2013.01); *H01M 8/04022* (2013.01); *H01M 8/04067* (2013.01);
(Continued)

(58) Field of Classification Search
CPC ........................................................ H01M 8/04
See application file for complete search history.

(56) References Cited

U.S. PATENT DOCUMENTS

| 2011/0076573 | A1 | 3/2011 | Akikusa et al. | |
| 2013/0029237 | A1* | 1/2013 | Fujisawa | H01M 8/2475 429/423 |
| 2013/0344408 | A1* | 12/2013 | Tatsui | H01M 8/0618 429/423 |

FOREIGN PATENT DOCUMENTS

| JP | S62-283570 A | 12/1987 |
| JP | 2004-284901 A | 10/2004 |

(Continued)

OTHER PUBLICATIONS

International Search Report for PCT/JP2014/054556 dated May 27, 2014.

*Primary Examiner* — Jacob Marks
(74) *Attorney, Agent, or Firm* — Studebaker & Brackett PC (57) ABSTRACT

An object is to provide a highly efficient and small-sized fuel cell module. To achieve this object, a cell stack 10, a reformer 20, and an evaporator 30 are accommodated together in a casing 50. The reformer 20 and the evaporator 30 are formed as vertical structures independently juxtaposed to each other and are disposed adjacent to the cell stack. The reformer 20 and the evaporator 30 are heated with exhaust gas resulting from combustion of off-gas released from the cell stack 10. Exhaust gas flow paths respectively are disposed to the reformer 20 and the evaporator 30 so as to let the combustion exhaust gas pass through in a vertical direction for heating the reformer and the evaporator. The exhaust gas flow paths of the reformer 20 and the evaporator 30 are connected in series through a connection pipe 60 above the reformer 20 and the evaporator 30.

19 Claims, 7 Drawing Sheets

(51) Int. Cl.
  *H01M 8/04007*  (2016.01)
  *H01M 8/04119*  (2016.01)
  *H01M 8/04014*  (2016.01)
  *H01M 8/2465*   (2016.01)
  *H01M 8/124*    (2016.01)

(52) U.S. Cl.
  CPC ... *H01M 8/04074* (2013.01); *H01M 8/04126* (2013.01); *H01M 8/0625* (2013.01); *H01M 8/2465* (2013.01); *H01M 2008/1293* (2013.01)

(56) References Cited

FOREIGN PATENT DOCUMENTS

| | | |
|---|---|---|
| JP | 2005-019036 A | 1/2005 |
| JP | 2005-225684 A | 8/2005 |
| JP | 2005-306658 A | 11/2005 |
| JP | 2006-019084 A | 1/2006 |
| JP | 2006-269419 A | 10/2006 |
| JP | 4233903 B2 | 12/2008 |
| WO | 2007/110587 A2 | 10/2007 |

* cited by examiner

FUEL CELL MODULE

TECHNICAL FIELD

This invention relates to a fuel cell module used in a fuel cell system, particularly to a fuel cell module as a main body of a fuel cell system including a cell stack, a reformer, an evaporator, etc. forming a principal part of the fuel cell system and accommodated together in a casing.

BACKGROUND ART

In a fuel cell system, plate-like cells each considered as one unit are stacked in a thickness direction to form what is called a cell stack as a principal component of the system. Though depending on the type of a fuel cell, the cell stack is generally formed of a reformer to generate hydrogen-rich reformed gas to be supplied to the cell stack, an evaporator to generate steam for the reforming, and a heat exchanger to preheat air or the like to be supplied as oxidized gas to the cell stack by using exhaust gas resulting from combustion of off-gas released from the cell stack, for example. These components are accommodated together in a casing to become a product as a fuel cell module. The off-gas collectively means gases to be released from the cell stack. The off-gas includes unburned gas released from the cell stack while power is generated, and city gas and reformed gas released from the cell stack at the start of operation before power is generated, for example.

The performance of such a fuel cell system has been enhanced remarkably in recent years which has facilitated size reduction of the system. Fuel cell systems for home use have started to become commercially available.

A fuel cell system for home use is required to satisfy requirements in terms of cost and size. Regarding the size, the size of a fuel cell module as the aforementioned system main body is given particular importance. This is for the reason that in the case of a fuel cell for home use, a fuel cell module as the largest module is generally given limited space for installation and should be installed in a narrow space in many cases. This necessitates further reduction in size of the fuel cell module. However, the fuel cell module cannot easily be reduced further in size than it is at present.

Specifically, a main mechanism in the fuel cell module is the cell stack. The cell stack is actually the largest part and occupies the largest space in the casing. Modifications have been made in every aspect for size reduction of the cell stack. Meanwhile, the reformer, the evaporator, etc. as auxiliary mechanisms are substantially smaller than the cell stack as the main mechanism. Modifications having been made for the auxiliary mechanisms have been limited to aspects of efficiency and durability. Auxiliary mechanisms in a two-stage cylindrical form are described as efficient mechanisms in patent literatures 1 and 2. This two-stage cylindrical form includes an evaporator formed into a vertical cylindrical shape and a reformer also formed into a vertical cylindrical shape coaxially coupled to the evaporator in a position above the evaporator. Auxiliary mechanisms in a double cylindrical form are also known (patent literature 3). This double cylindrical form includes a reformer formed into a vertical cylindrical shape and an evaporator also formed into a vertical cylindrical shape combined to the reformer outside the reformer in a concentric pattern.

The reformer and the evaporator use combustion exhaust gas as a heat source that results from combustion of off-gas such as unburned gas released from the cell stack without having been used for power generation in the cell stack. In particular, steam reforming is a reaction of absorbing heat. Thus, heating in the reformer, more specifically heat exchange with the combustion exhaust gas becomes an important issue. The two-stage cylindrical form and the double cylindrical form intended for integration of the reformer and the evaporator act advantageously from a viewpoint of usage of heat of the combustion exhaust gas.

PRIOR ART LITERATURE

Patent Literature

Patent Literature 1: Japanese Patent Application Publication. 2005-225684
Patent Literature 2: Japanese Patent Application Publication. 2005-306658
Patent Literature 3: Publication of Japanese Patent No. 4233903

SUMMARY OF INVENTION

Technical Problem

It is an object of this invention to provide a fuel cell module enabling considerable size reduction while maintaining high efficiency.

Solution to Problem

To achieve the aforementioned object, the present inventors paid attention to the structure of the reformer and that of the evaporator to be combined as auxiliary mechanisms to the cell stack as the main mechanism. These auxiliary mechanisms are juxtaposed to each other next to the cell stack in the casing (see FIGS. 6A and 6B). The present inventors found that the size of the casing is actually affected largely by the respective structures of these auxiliary mechanisms, particularly by a combined structure of the auxiliary mechanisms, as described in detail below.

The size of the fuel cell module being determined by the size of the cell stack as the main mechanism may be acceptable. However, being forced to increase the size of the fuel cell module more than necessary depending on the size of the reformer, the evaporator or the like as the auxiliary mechanism is not considered to be rational and is desired to be avoided as much as possible. The structures of the auxiliary mechanisms, particularly a combined structure thereof is considered from this viewpoint. In the case of the two-stage cylindrical form where the reformer and the evaporator as the auxiliary mechanisms are each formed into a vertical cylindrical shape and are combined in two stages in the direction of a central axis, the height of the two-stage cylinder becomes inevitably high and may exceed the height of the cell stack in many cases. If the height of the reformer and the evaporator is greater than that of the cell stack, the height of the auxiliary mechanisms becomes a determinant for the height of the fuel cell module. This causes an irrational issue as described above.

Even in the case of the two-stage cylindrical form, the height of the two-stage cylinder can still be made smaller than that of the cell stack. Meanwhile, the quantity of a catalyst in the reformer is determined depending on the scale of the module while the size of effective space in the evaporator is further determined depending on the scale of the module. Thus, reduction in the height necessitates corresponding increase in an outer diameter. This makes increase in the breadth of the fuel cell module unavoidable.

This also applies to the case where auxiliary mechanisms are provided in the double cylindrical form.

Figure 6A:
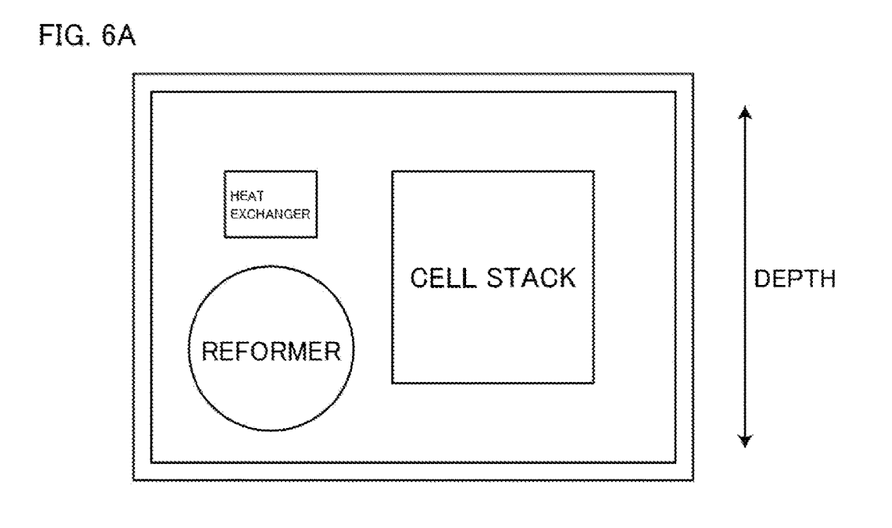
FIG. 6A is a plan view showing an outline of the structure of a conventional fuel cell module.
Figure 6B:
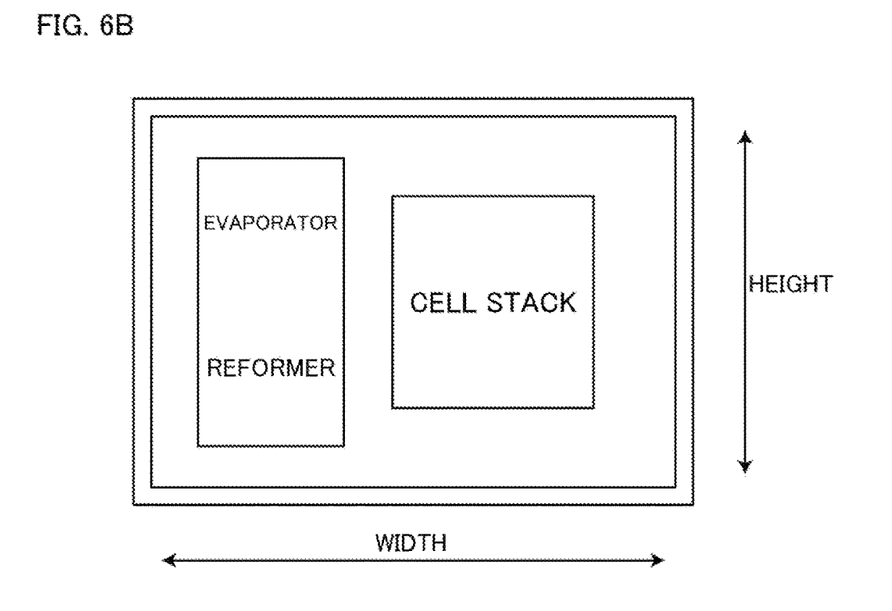
FIG. 6B is a front view showing the outline of the structure of the conventional fuel cell module.

Regarding the heat exchanger to preheat air or the like to be supplied as oxidized gas to the cell stack by using exhaust gas resulting from combustion of off-gas such as unburned gas and the like released from the cell stack, juxtaposing the heat exchanger to the reformer and the evaporator in empty space next to the cell stack and behind the reformer and the evaporator is considered to be rational so as to avoid the influence of the heat exchanger on the size of the fuel cell module (see FIGS. 6A and 6B).

Under the aforementioned restrictions, under a plan to and with an intention to make the reformer and the evaporator as the auxiliary mechanisms shorter than the cell stack while avoiding increase in the respective outer diameters of the reformer and the evaporator, or rather, while reducing these outer diameters, the present inventors particularly examined various combined structures of the reformer and the evaporator. As a result, the present inventors found that if the reformer and the evaporator as the auxiliary mechanisms are arranged independently of each other, their respective outer diameters become substantially the same while their respective heights become substantially the same. The present inventors further found that juxtaposing the reformer and the evaporator to each other both in standing postures and in positions immediately next to the cell stack can control the amount of lateral projection to a minimum while limiting the respective heights and the respective depths of the reformer and the evaporator within a range of the size of the cell stack. The present inventors also found that connecting exhaust gas flow paths respectively disposed to the reformer and the evaporator for letting combustion exhaust gas pass through for heating the reformer and the evaporator through a pipe above the reformer and the evaporator, particularly connecting these exhaust gas flow paths in series through a bare pipe acts effectively in terms of heat usage.

Specifically, juxtaposing the reformer and the evaporator as independent units to each other in standing postures disposed adjacent to the cell stack considerably reduces the respective heights of these auxiliary mechanisms. Thus, substantially no constraint will be imposed on a height. Even in consideration of an increase in height brought about by the connection pipe above the reformer and the evaporator, the reformer and the evaporator can still be higher than those in tandem in two stages, so that the reformer and the evaporator can be reduced in thickness. As a result, the reformer and the evaporator can be juxtaposed and parallel to each other in the depth direction efficiently both adjacent to the cell stack, thereby allowing reduction in a module width within a limited range of the height and the depth of the cell stack.

A fuel cell module of this invention has been completed based on the aforementioned knowledge. The fuel cell module includes: a cell stack formed by stacking plate-like cells each considered as one unit in a thickness direction; a reformer to generate hydrogen-rich reformed gas to be supplied to the cell stack by using exhaust gas as a heat source resulting from combustion of off-gas released from the cell stack; an evaporator to generate steam for the reforming; and a heat exchanger to preheat oxidized gas to be supplied to the cell stack by using the combustion exhaust gas. The cell stack, the reformer, the evaporator, and the heat exchanger are accommodated together in a casing. The reformer and the evaporator are formed as vertical structures independently juxtaposed to each other in a depth direction and are disposed adjacent to the cell stack. Exhaust gas flow paths respectively are disposed to the reformer and the evaporator so as to let the combustion exhaust gas pass through in a vertical direction for heating the reformer and the evaporator. The exhaust gas flow paths in the reformer and the evaporator are connected in series through a connection pipe above the reformer and the evaporator.

In the fuel cell module of this invention, assuming the height of the cell stack to be 1, it is preferable that the height of each of the reformer and the evaporator be 0.5 to 1.2, more preferably, 0.7 to 1.0. As described above, the content of each of the reformer and the evaporator is determined based on the scale of output power of the cell stack. Under these circumstances, making each of the reformer and the evaporator too short compared to the cell stack results in increase in the respective outer diameters of the reformer and the evaporator, causing increase in the breadth of the casing to an extent greater than is necessary. Conversely, if the reformer and the evaporator are too high, the height of the casing is dominated by the height of each of the reformer and the evaporator, causing increase in the height of the casing to an extent greater than is necessary.

The connection pipe connecting the exhaust gas flow paths in the reformer and the evaporator is arranged above the reformer and the evaporator with the intention of making the connection pipe function as an effective exposed heater for the cell stack, particularly as a heater to operate at the time of start up. Conversely, during a rated operation, the connection pipe becomes lower in temperature than the cell stack, so that it in turn functions as a cooler for the cell stack. For these reasons, it is preferable that the connection pipe be a bare pipe not hindering heat dissipation and heat absorption.

Regarding the form of the connection pipe, the connection pipe may be a horizontal pipe form for connecting upper end portions of the exhaust gas flow paths in the reformer and the evaporator through a horizontal pipe. Alternatively, the connection pipe may be an inverted U pipe form for connecting the upper end portions of the exhaust gas flow paths through a pipe of an inverted U shape. In terms of enhancing the function as a heater, the inverted U pipe form providing a larger surface area is preferable. Meanwhile, the inverted U pipe form becomes a cause for increase in the height of an auxiliary mechanism. Thus, it is preferable that the height of the connection pipe be minimized by forming a central portion of the pipe as a horizontal pipe.

The height of each of the reformer and the evaporator means a height including the pipe connecting the reformer and the evaporator and an accompanying component such as a combustion unit which will be described later. The height of the cell stack also means a height including an accompanying component such as a pipe connecting the cell stack and an auxiliary mechanism such as the reformer or the evaporator (see FIG. 1B). What is to be considered is an influence on a module scale; therefore it is needless to say that the height of each of the reformer and the evaporator means a substantive height including an accompanying component.

Regarding the heat exchanger used for preheating oxidized gas, as long as space for the heat exchanger is reserved next to the cell stack, the heat exchanger may be arranged next to the cell stack together with the reformer and the evaporator. However, if limitations imposed by the depth of the cell stack make it difficult to arrange the heat exchanger next to the cell stack, the heat exchanger may be arranged further laterally next to the reformer and the evaporator. However, this causes a serious risk of increase in the width of the casing.

As a result of comprehensive consideration of the aforementioned issues, in the fuel cell module of this invention, limitations on the height of each of the reformer and the evaporator juxtaposed to each other next to the cell stack are removed. Thus, arranging the heat exchanger below the reformer and the evaporator is desirable as it provides effective usage of space inside the casing and achieves efficient connection through a pipe with a different auxiliary mechanism above the heat exchanger. The heat exchanger has a temperature below that of a different auxiliary mechanism, so that the heat exchanger can be arranged in a level even below the cell stack. That is, a heat-insulating material extends along the inner surface of the casing. The temperature of the heat exchanger is below that of the different auxiliary mechanism. Thus, the heat exchanger can be arranged to fit into a place prepared by reducing the thickness of the heat-insulating material on a bottom plate of the casing.

A preferable form of the heat exchanger is a thin-laminated type in terms of a low height of the thin-laminated type itself and suppression of a module height. In this thin-laminated type, air flow paths and exhaust gas flow paths formed like horizontal planes respectively are stacked alternately and the heat exchanger is configured to heat air introduced into the heat exchanger by concurrent and countercurrent heat exchange with combustion exhaust gas flown into the heat exchanger from a direction of the evaporator. In particular, forming a fluid flow path in the bottom layer as the air flow path is preferable as it reduces the temperature of a bottom surface and allows further reduction of the thickness of the heat-insulating material below the bottom surface.

An operating temperature for the evaporator is below an operating temperature for the cell stack and below an ambient temperature in the casing. Thus, it is preferable that the evaporator be thermally insulated partially in the casing with a dedicated heat-insulating material.

Regarding the structure of each of the reformer and the evaporator, a double tube structure is preferable as it is a simple structure, achieves high heat exchange efficiency, and achieves size reduction easily. This double tube structure includes an inner tube and an outer tube arranged outside the inner tube in a concentric pattern while cylindrical space is formed between the inner tube and the outer tube. The inner tube provides the exhaust gas flow path inside thereof, for letting the combustion exhaust gas flow in a vertical direction. This double tube structure facilitates connection between the exhaust gas flow paths through the connection pipe. Specifically, the inner tube of the double tube is preferable as a combustion exhaust gas pipe providing the exhaust gas flow path inside thereof, for letting the combustion exhaust gas flow in a vertical direction.

Regarding a water-supply tube through which water is supplied into the cylindrical space formed between the inner tube and the outer tube in the evaporator, the water-supply tube may have an internal fit structure inserted into the inner tube in the evaporator. Alternatively, the water-supply tube may have an external fit structure using a spiral tube arranged below the cylindrical space and attached to the outside of the inner tube. In consideration of the occurrence of a break in the water-supply tube, the latter external fit structure is preferable as it does not cause internal leakage.

Advantageous Effects of Invention

In the fuel cell module of this invention, the reformer and the evaporator are formed as vertical structures independently juxtaposed and parallel to each other in the depth direction and are disposed adjacent to the cell stack. Further, the exhaust gas flow paths for letting combustion exhaust gas pass through for heating the reformer and the evaporator are connected in series through the connection pipe above the reformer and the evaporator. Even in consideration of increase in a height by the connection pipe above the reformer and the evaporator, this can still make the reformer and the evaporator higher than those in tandem in two stages because the respective heights of the reformer and the evaporator are largely reduced, so that the reformer and the evaporator can be reduced in thickness. As a result, the reformer and the evaporator can be juxtaposed and parallel to each other in the depth direction efficiently both adjacent to the cell stack, thereby allowing reduction in a module width within a limited range of the height and the depth of the cell stack.

In addition, the connection pipe connecting the exhaust gas flow paths in the reformer and the evaporator above the reformer and the evaporator functions as a heater for the cell stack at the time of start up to contribute to shortening of a start-up time, while functioning as a cooler for the cell stack during a rated operation to contribute to enhancement of power generation efficiency.

EMBODIMENT FOR CARRYING OUT INVENTION

An embodiment of this invention is described below by referring to the drawings.

Figure 1A:
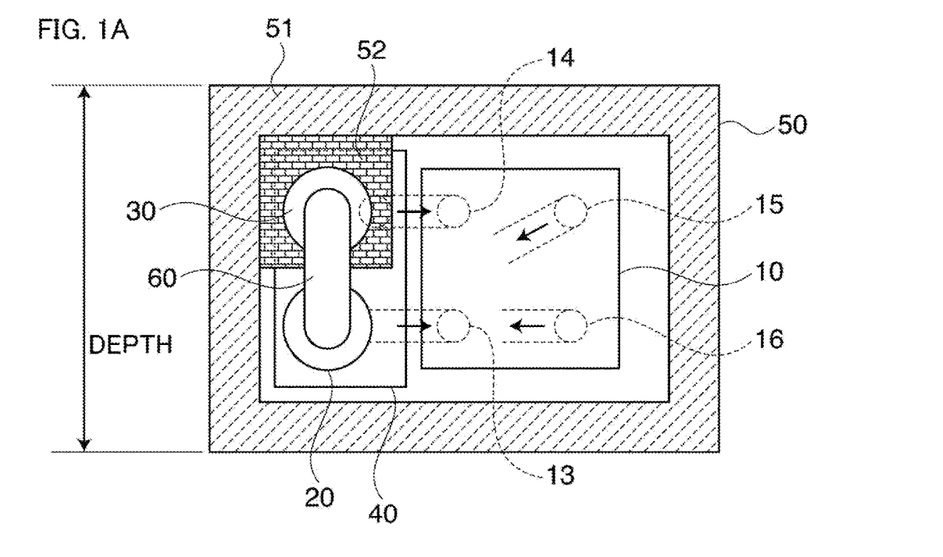
FIG. 1A is a plan view showing an outline of the structure of a fuel cell module according to an embodiment of this invention.
Figure 1B:
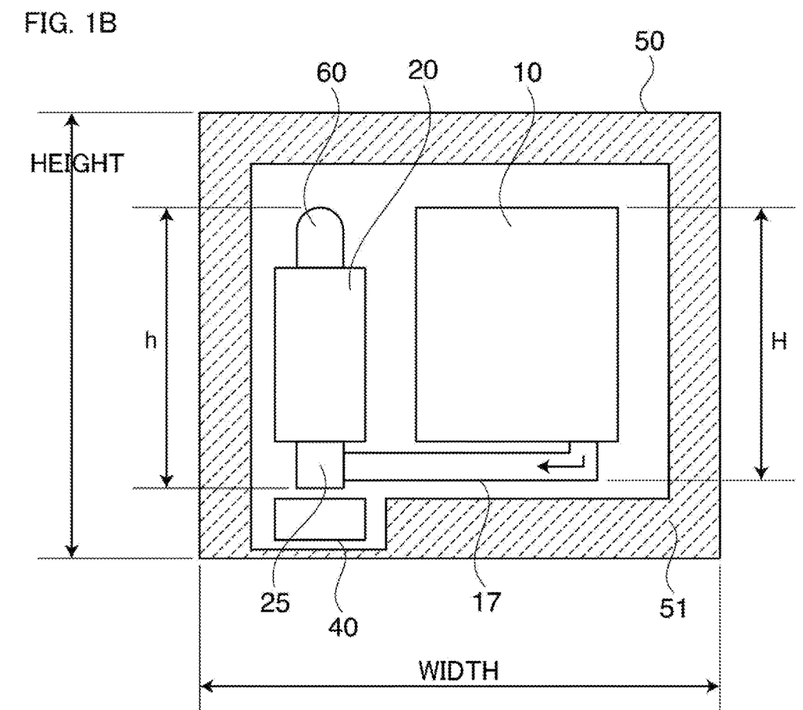
FIG. 1B is a front view showing the outline of the structure of the fuel cell module.

As shown in FIGS. 1A and 1B, a fuel cell module of this embodiment includes a cell stack 10 as a power generator as a principal part of a fuel cell system, a reformer 20 to generate hydrogen-rich reformed gas to be supplied as raw material gas to the cell stack 10, an evaporator 30 to generate steam for the reforming, and a heat exchanger 40 to preheat air to be supplied to the cell stack 10 by using combustion exhaust gas resulting from combustion of off-gas, specifically unreacted reformed gas and air released from the cell stack 10. The cell stack 10, the reformer 20, the evaporator 30, and the heat exchanger 40 are accommodated together in a rectangular casing 50.

Figure 2:
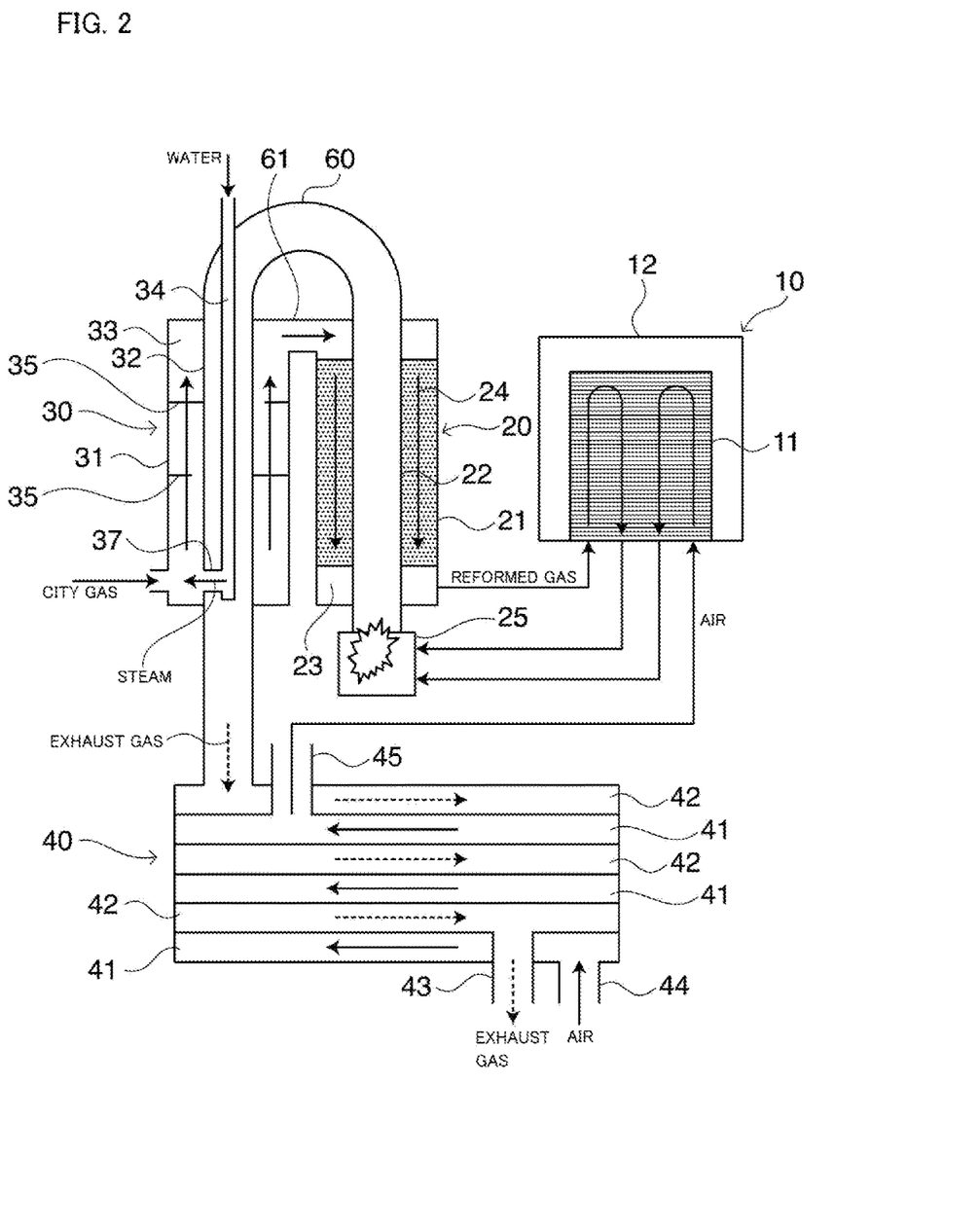
FIG. 2 shows the structure of a main mechanism and that of an auxiliary mechanism used in the fuel cell module.

As shown in FIG. 2, the cell stack 10 has a body 11 formed of a stack of rectangular parallelepipeds and a casing 12 housing the body 11. The body 11 of the cell stack 10 is formed by interleaving cells like horizontal flat plates each considered as one minimum constituting unit of a fuel cell together with current collectors, stacking interconnectors (separators) also formed into a horizontal plate-like shape in a thickness direction, and holding a resultant stack while applying pressure in the direction of the stack. The fuel cell mentioned herein is a solid-oxide fuel cell. Thus, each cell is formed as a rectangular flat plate of a three-layered structure including a solid electrolyte layer made of yttria-stabilized zirconia, a fuel electrode stacked on one surface side of the solid electrolyte layer and made of a cermet of Ni and YSZ, and a thin air electrode stacked on opposite surface side of the solid electrolyte layer and made of lanthanum strontium manganite (LSM).

Hydrogen-rich reformed gas and air as oxidized gas are supplied to the cell stack 10 through a reformed gas inlet 13 and an air inlet 14 respectively provided in the lower surface of the cell stack 10 (see FIG. 1A). The introduced reformed gas and the introduced air are supplied parallel to each other to each cell and contribute to power generation while passing through each cell in the horizontal direction. After the reformed gas and the air are used for cell reaction in each cell, unreacted residual reformed gas and unreacted residual air are collected and emitted downward through a reformed gas outlet 15 and an air outlet 16 respectively provided in the lower surface (see FIG. 1A).

The reformer 20 and the evaporator 30 combined as auxiliary mechanisms to the cell stack 10 as a main mechanism both each have a vertical cylindrical shape. The reformer 20 and the evaporator 30 are juxtaposed to each other in the depth direction of the cell stack 10 and are arranged immediately next to the cell stack 10 (see FIGS. 1A and 1B).

As shown in FIG. 2, the reformer 20 on a front side has a double tube structure with an inner tube 22 penetrating a central portion of an outer tube 21. Opposite end portions of the outer tube 21 are closed with the external side of the inner tube 22 to form a cylindrical space 23 between the outer tube 21 and the inner tube 22. The cylindrical space 23 is filled with a catalyst 24 for steam reforming except in a space for gas flow at the opposite end portions.

Referring further to FIG. 2, the evaporator 30 behind the reformer 20 has a triple tube structure including an outer tube 31 and an inner tube 32 combined in a concentric pattern like the outer tube 21 and the inner tube 22 in the reformer 20, and a water-supply tube 34 inserted in a central portion of the inner tube 22. Specifically, the evaporator 30 itself has a double tube structure with a combination of the outer tube 31 and the inner tube 32. Meanwhile, inserting the water-supply tube 34 in the central portion of the inner tube 32 forms a triple tube structure in the evaporator 30.

The inner tube 22 in the reformer 20 and the inner tube 32 in the evaporator 30 form a combustion exhaust gas pipe providing an exhaust gas flow path inside thereof, for letting the combustion exhaust gas flow in a vertical direction. Respective upper end portions of the inner tubes 22 and 32 are connected through a pipe 60 of an inverted U shape. A combustion unit 25 is attached to a lower end portion of the inner tube 22 as an entrance. The combustion unit 25 starts combustion in response to introduction of unreacted reformed gas and air emitted downward from the cell stack 10 into the combustion unit 25. Then, exhaust gas resulting from the combustion goes up in the inner tube 22, passes through the connection pipe 60, goes down in the inner tube 32, and is then fed to the heat exchanger 40 below. The connection pipe 60 is to function both as a heater and a cooler. Thus, the connection pipe 60 is a single pipe of excellent efficiency of heat exchange with the outside of the pipe and is a bare pipe not covered with a heat-insulating material.

Figure 3A:
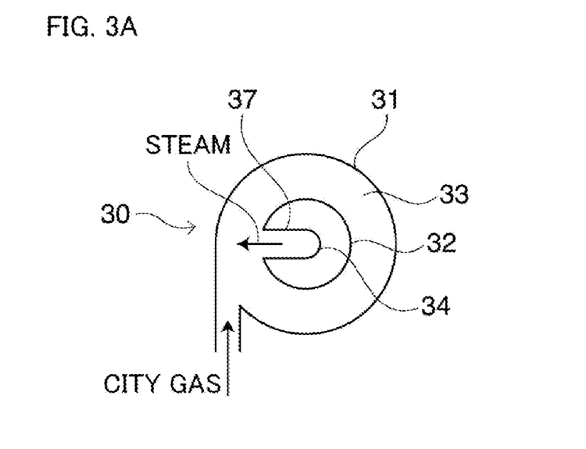
FIG. 3A shows the structure of an evaporator as part of the auxiliary mechanism at a horizontal cross section of a bottom portion of the evaporator.
Figure 3B:
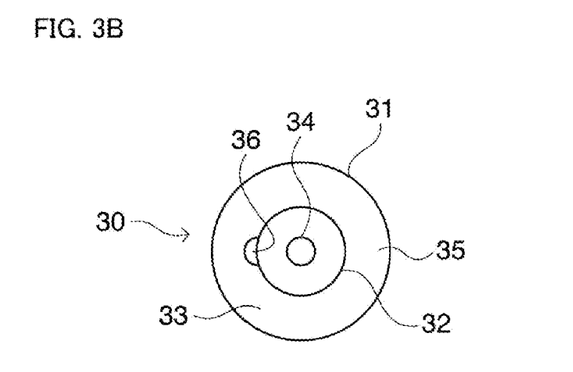
FIG. 3B shows the structure of the evaporator at a horizontal cross section of an intermediate portion of the evaporator.

From a viewpoint of enhancing reforming efficiency, the evaporator 30 of this embodiment has a structure with a mixing part to mix generated steam with a methane-series gas such as city gas to become a raw material for reformed gas. In this connection, the water-supply tube 34 in the inner tube 32 is inserted in the central portion of the vertical inner tube 23 at a right angle to the inner tube 23, as shown in FIG. 3A. A lower end portion of the water-supply tube 34 is connected through a connection pipe 37 to a lower end portion of the cylindrical space 33 between the outer tube 31 and the inner tube 32. Methane-series gas such as city gas to become a raw material for reformed gas is introduced through the lower end portion of the cylindrical space 33 in a direction of a connection to the inner circumferential surface of the outer tube 31. As shown in FIG. 3B, air collecting plates 35 with a flange shape are provided in multiple layers in an intermediate portion of the cylindrical space 33. The plurality of air collecting plates 35 are arranged in multiple layers such that an air hole 36 provided in a part of an inner circumferential area thereof in a circumferential direction is displaced stepwise in the circumferential direction.

An upper end portion of the cylindrical space 33 communicates with an upper end portion of the cylindrical space 23 between the outer tube 21 and the inner tube 22 in the reformer 20 through a horizontal connection pipe 61. A lower end portion of the cylindrical space 23 is connected to the reformed gas inlet 13 in the lower surface of the cell stack 10 through a connection pipe not shown in the drawings.

As described above, the height h of each of the reformer 20 and the evaporator 30 juxtaposed to each other next to the cell stack 10 includes the height of the connection pipe 60 above the reformer 20 and the evaporator 30 and the height of the combustion unit 25 below the reformer 20 and the evaporator 30. The height h is substantially the same as the height H of the cell stack 10 (see FIG. 1B). As described above, the height H of the cell stack 10 also includes the height of a connection pipe 17 arranged below the cell stack 10 for connection with the auxiliary mechanism. The collective depth of the auxiliary mechanisms including the reformer 20 and the evaporator 30 is substantially the same as the depth of the cell stack 10 (see FIG. 1A).

The heat exchanger 40 is arranged directly below the reformer 20 and the evaporator 30 juxtaposed to each other next to the cell stack 10 (see FIGS. 1A and 1B). The heat exchanger 40 is a rectangular parallelepiped extending long in the depth direction. The heat exchanger 40 has a multi-layered structure in multiple layers including an air flow path 41 formed like a horizontal plane and exhaust gas flow paths 42 also formed like horizontal planes stacked alternately. The air flow path 41 forms the bottom layer.

The upper surface of the heat exchanger 40 at one end portion of the longitudinal direction is connected to a lower end portion of the inner tube 32 in the evaporator 30, specifically an exit of a combustion gas pipe. Combustion exhaust gas introduced through the upper surface of the heat exchanger 40 at one end portion of the longitudinal direction flows through the exhaust gas flow path 42 in the heat exchanger 40 toward an opposite end portion of the longitudinal direction and is then emitted through an exhaust gas emission tube 43 provided to the lower surface at the opposite end portion of the longitudinal direction. An air inlet tube 44 is provided to the lower surface of the heat exchanger 40 at the opposite end portion of the longitudinal direction. Air introduced through the lower surface at the opposite end portion of the longitudinal direction flows through the air flow path 41 in the heat exchanger 40 toward one end portion of the longitudinal direction and is then emitted through an air emission tube 45 provided to the upper surface at one end portion of the longitudinal direction. The air emission tube 45 is connected to the air inlet 14 in the lower surface of the cell stack 10 (see FIG. 1A) through a connection pipe not shown in the drawings.

As a result, while air at an ordinary temperature introduced through the air inlet tube 44 into the plurality of air flow paths 41 in the heat exchanger 40 flows toward one end portion of the longitudinal direction, the air is preheated by concurrent and countercurrent heat exchange with combustion exhaust gas also introduced in the plurality of exhaust gas flow paths 41 in the heat exchanger 40. The preheated air passes through the air emission tube 45 provided to one end portion of the longitudinal direction and the connection pipe not shown in the drawings. Then, the preheated air is introduced into the cell stack 10 through the air inlet 14 in the lower surface of the cell stack 10.

The casing 50 housing the aforementioned auxiliary mechanisms together with the cell stack 10 is a rectangular box made of a refractory metal. The casing 50 is thermally blocked from the outside with a heat-insulating material 51 extending along the inner surface of the casing 50. The heat exchanger 40 directly below the reformer 20 and the evaporator 30 is arranged in a level below the cell stack 10. This is achieved by accommodating the heat exchanger 40 in a recess formed by reducing the thickness of a corresponding part of the heat-insulating material 51 on a bottom plate of the casing 50.

The evaporator 30 as one of the auxiliary mechanisms in the casing 50 is surrounded by a different heat-insulating material 52 to be thermally insulated partially, thereby enhancing the heat insulating properties of the evaporator 30.

The function of the heat exchanger module of this embodiment is described next.

During a rated operation, city gas (13A) is supplied as methane-series gas to become a raw material for reformed gas to the lower end portion of the cylindrical space 33 between the outer tube 31 and the inner tube 32 in the evaporator 30 arranged next to the cell stack 10. Meanwhile, water is supplied to the water-supply tube 34 in the evaporator 30. Further, air is supplied as oxidized gas to the heat exchanger 40 through the air inlet tube 44 in the lower surface of the heat exchanger 40 below the reformer 20 and the evaporator 30 arranged together next to the cell stack 10. Unreacted reformed gas (hydrogen-rich gas) and air are fed from the cell stack 10 to the combustion unit 25 of the reformer 20.

The feed of the unreacted reformed gas (hydrogen-rich gas) and the air from the cell stack 10 to the combustion unit 25 brings about combustion. The combustion unit 25 is attached to the lower end portion of the inner tube 22 in the reformer 20. Thus, exhaust gas resulting from the combustion goes up in the inner tube 22, passes through the connection pipe 60 of an inverted U shape, goes down in the inner tube 32 in the evaporator 30, and then passes through the heat exchanger 40 below.

The combustion exhaust gas is at a high temperature around 1000° C. The combustion exhaust gas heats the catalyst 24 for steam reforming from inside filling the cylindrical space 23 between the inner tube 22 and the outer tube 21 in the reformer 20 while going up in the inner tube 22. Further, while going down in the inner tube 32 in the evaporator 30, the combustion exhaust gas heats the inside of the inner tube 32, heats the water-supply tube 34 in the inner tube 32 from outside, and heats the cylindrical space 33 between the inner tube 32 and the outer tube 31 from inside. Thus, the water supplied to the water-supply tube 34 evaporates inside the water-supply tube 34. Resultant steam is supplied to the lower end portion of the cylindrical space 33 and mixed with the city gas (13A) supplied to this lower end portion. As a result, mixed gas of the city gas (13A) and the steam goes up in the cylindrical space 33 while being heated.

The city gas (13A) forms a swirl flow by being supplied from outside into the lower end portion of the cylindrical space 33 in a tangential direction. Thus, the city gas (13A) is mixed efficiently with the steam supplied from inside into the lower end portion of the cylindrical space 33 in a radial direction. Additionally, the plurality of air collecting plates 35 are arranged in multiple layers in the cylindrical space 33 such that the air hole 36 provided in a part of the inner circumferential area thereof in the circumferential direction is displaced stepwise in the circumferential direction. This narrows the flow of the mixed gas of the city gas (13A) and the steam each time the mixed gas passes through the air hole 36 of the air collecting plates 35, so that the mixed gas is concentrated and diffused repeatedly. Additionally, as a result of the existence of the air hole 36 displaced in the circumferential direction of the inner circumferential area where the corresponding air collecting plate 35 contacts the inner tube 32, mixture of the city gas (13A) with the steam is facilitated further in the cylindrical space 33. In this way, the mixed gas of the city gas (13A) and the steam is heated efficiently in the cylindrical space 33.

Regarding typical examples of the temperature of the combustion exhaust gas, the temperature drops from 1000° C. to about 750° C. while the combustion exhaust gas passes through the reformer 20. The combustion exhaust gas passes through the connection pipe 60 of an inverted U shape at about 750° C. The temperature thereafter drops from about 750° C. to about 550° C. while the combustion exhaust gas passes through the evaporator 30. The temperature drops further from about 550° C. to about 250° C. while the combustion exhaust gas passes through the heat exchanger 40.

The high-temperature mixed gas of the city gas and the steam generated in the evaporator 30 passes through the connection pipe 61 and then passes through the inside of the high-temperature catalyst 24 from top to bottom filling the cylindrical space 23 between the outer tube 21 and the inner tube 22 in the reformer 20. As a result, the hydrogen-rich steam-reformed gas from 600 to 700° C. is introduced from a bottom portion of the cylindrical space 23 into the cell stack 10 through the reformed gas inlet 13 in the lower surface of the cell stack 10. Air as oxidized gas is introduced simultaneously into the cell stack 10 through the air inlet 14 in the lower surface of the cell stack 10. This air is preheated in the heat exchanger 40.

Specifically, the heat exchanger 40 has a thin structure where the planar air flow paths 41 and the planar exhaust gas flow paths 42 are stacked alternately and the heat exchanger 40 is configured to heat air at an ordinary temperature introduced into the heat exchanger 40 by concurrent and countercurrent heat exchange with the combustion exhaust gas flown into the heat exchanger 40 from a direction of the evaporator 30. This suppresses the thickness of the stack (height) to be small while heating the air efficiently to 400° C. or more.

The heat exchanger 40 is a unit in the lowest temperature in the flow path for the combustion exhaust gas. Further, a fluid flow path in the bottom layer is the air flow path 41, so the lower surface is the lowest in temperature in the heat exchanger 40. Thus, reducing the thickness of the heat-insulating material 51 extending along the inner surface of the casing 50, particularly along the inner surface of the bottom plate of the casing 50 in a position where the heat exchanger 40 is to be arranged and inserting the heat exchanger 40 in the resultant recess does not cause any problem in terms of heat insulation. This arrangement contributes to suppression of the height of the auxiliary mechanism in cooperation with the thin structure of the heat exchanger 40.

In the cell stack 10, the steam-reformed gas from 600 to 700° C. and the air at 400° C. or more flow parallel to each other into an anode side and a cathode side of each of the stacked cells. This causes a power generation reaction in each cell to generate certain electromotive force. The reformed gas and the air are supplied to the cell stack 10 in rather large quantities. This generates unreacted reformed gas and residual air. This reformed gas and residual air are fed to the combustion unit 25 of the reformer 20 to become sources for combustion exhaust gas, as described above.

An operating temperature for the cell stack 10 is about 800° C. and a temperature inside the casing 50 is also about 800° C. Like that for the cell stack 10, an operating temperature for the reformer 20 as the auxiliary mechanism is about 800° C. Meanwhile, an operating temperature for the evaporator 30 should be maintained at 600° C. or less. For this reason, the reformer 20 is disposed on an upstream side relative to the evaporator 30 in a flow direction of the combustion exhaust gas and the evaporator 30 is disposed on a downstream side relative to the reformer 20 in the flow direction. However, as a result of temperature rise to about 800° C. inside the casing 50, the operating temperature for the evaporator 30 cannot be maintained at 600° C. or less only by determining the positions of the reformer 20 and the evaporator 30 relative to each other. In response, in the fuel cell module of this embodiment, the evaporator 30 in the casing 50 is thermally insulated by being surrounded independently by the heat-insulating material 52 different from the heat-insulating material 51 extending along the inner surface of the casing 50, thereby maintaining the operating temperature of the evaporator 30 at 600° C. or less.

As described above, the temperature of the connection pipe 60 of an inverted U shape connecting the inner tube 22 in the reformer 20 and the inner tube 32 in the evaporator 30 above the reformer 20 and the evaporator 30 is about 750° C. This temperature is below the operating temperature for the cell stack 10 and the temperature in the casing 50 both at about 800° C. This makes the connection pipe 60 of an inverted U shape function as a cooler for the cell stack 10 during the rated operation.

At the start of operation, the connection pipe 60 of an inverted U shape connecting the inner tube 22 in the reformer 20 and the inner tube 32 in the evaporator 30 above the reformer 20 and the evaporator 30 in turn functions as a heater for the cell stack 10.

Specifically, when the operation is started at an ordinary temperature, the city gas 13A is supplied to the evaporator 30. At this time, the evaporator 30 and the reformer 20 are at an ordinary temperature. Thus, the supplied city gas 13A passes through the inside of the catalyst 24 filling the cylindrical space 23 between the outer tube 21 and the inner tube 22 in the reformer 20 without causing any reaction and then flows into the cell stack 10. Further, air as oxidized gas is supplied to the heat exchanger 40. The heat exchanger 40 is at an ordinary temperature, so that the air supplied to the heat exchanger 40 is supplied to the cell stack 10 while being kept at the ordinary temperature. The city gas 13A and the air both at the ordinary temperature pass through the cell stack 10 without causing any reaction and then flow into the combustion unit 25 of the reformer 10. This causes ignition of the city gas 13A as a first reaction to start combustion. Then, resultant combustion exhaust gas starts to pass through the reformer 20, the connection pipe 60, the evaporator 30, and the heat exchanger 40.

This combustion exhaust gas does not differ largely in temperature from combustion exhaust gas resulting from reaction of unreacted reformed gas and air occurring during the operation. Thus, the connection pipe 60 made of a bare pipe, specifically a metal pipe without a covering is immediately heated to several hundreds of degrees Celsius, contributing to preheating of the inside of the casing 50, particularly preheating of the cell stack 10.

When the reformer 20 is placed at 300° C. or more in response to the flow of the combustion exhaust gas, supply of water to the evaporator 30 is started, thereby starting supply of steam into the cylindrical space 33 in the evaporator 30. Then, mixed gas of the heated city gas 13A and the steam is fed to the reformer 20 and starts to react inside the catalyst 24 in the reformer 20, thereby starting generation of reformed gas. Then, the exhaust gas resulting from the combustion of the city gas 13A is replaced by exhaust gas resulting from combustion of the reformed gas. The resultant combustion exhaust gas starts to flow through the reformer 20, the connection pipe 60, the evaporator 30, and the heat exchanger 40. When the cell stack 10 reaches an operation start temperature, the cell stack 10 starts to generate power. As described above, heat dissipated from the connection pipe 60 contributes to this preheating of the cell stack 10.

The cell stack 10 and the reformer 20 finally reach a rated temperature of about 800° C., thereby entering a state of the aforementioned rated operation.

The aforementioned fuel cell module of this embodiment has the following superiorities over the conventional module.

Regarding the structure of the auxiliary mechanism, the fuel cell module of this embodiment employs a structure where the reformer 20 and the evaporator 30 as major auxiliary mechanisms are formed as vertical cylinders independently and the reformer 20 and the evaporator 30 are juxtaposed to each other in the depth direction and are disposed in close positions adjacent to the cell stack 10. Exhaust gas flow paths respectively are disposed to internal spaces of the reformer 20 and the evaporator 30 so as to let combustion exhaust gas pass through in a vertical direction. The reformer 20 is disposed on an upstream side relative to the evaporator 30 in the flow direction of the combustion exhaust gas and the evaporator 30 is disposed on a downstream side relative to the reformer 20 in the flow direction and these exhaust gas flow paths are connected through the connection pipe 60 of an inverted U shape above the reformer 20 and the evaporator 30.

Referring to the conventional module shown in FIGS. 6A and 6B as a comparison, specifically a fuel cell module where an evaporator of a cylindrical shape and a reformer also of a cylindrical shape coupled in a concentric pattern to the evaporator in a position above the evaporator form a vertical cylinder of auxiliary mechanisms in two stages juxtaposed next to a cell stack, the height of each of the reformer 20 and the evaporator 30 as the major auxiliary mechanisms being increased in this conventional module. In many cases, the height h of the major auxiliary mechanisms dominates the height of the module 10. This increases the height of the module 10 more than necessary, compared to the height H of the cell stack 10 as the main mechanism. If the height h of the major auxiliary mechanisms is to be reduced, the outer diameters of the auxiliary mechanisms should be increased in order to ensure their internal capacities.

In contrast, according to the fuel cell module of this embodiment, the reformer 20 and the evaporator 30 are independently disposed in standing postures and in different positions adjacent to the cell stack 10. This considerably reduces the height h of the major auxiliary mechanism. Even a height including the connection pipe 50 above the major auxiliary mechanism can still be controlled to a level substantially the same as the height H of the cell stack 10. Specifically, the cell stack 10 as the main mechanism can be a determinant for the height of the module. Further, the height of each of the reformer 20 and the evaporator 30 is given a margin. Thus, even with reduction in outer diameter of each of the reformer 20 and the evaporator 30, an internal capacity can still be ensured. This allows reduction of the outer diameter, so that the module can be controlled to a small width.

In terms of concrete numerical values, in the case of a solid electrolyte fuel cell module of 1 kW class output, if the height of the conventional module shown in FIGS. 6A and 6B is determined based on the height H of the cell stack 10, the height, the breadth, and the depth become 400 mm, 420 mm, and 290 mm respectively according to the typical examples. In the fuel cell module of this embodiment, the height, the breadth, and the depth become 400 mm, 375 mm, and 290 mm respectively, meaning that the breadth can be reduced by 45 mm.

Regarding the positions of the exhaust gas flow paths in the reformer 20 and the evaporator 30 relative to each other, the flow path in the reformer 20 should be disposed on an upstream side relative to that in the evaporator 30 in the flow direction of the combustion exhaust gas and the flow path in the evaporator 30 should be disposed on a downstream side relative to that in the reformer 20 in the flow direction in terms of a relationship with a heating temperature. This is achieved by a simple structure. Specifically, what is required is only to introduce combustion exhaust gas through a lower part of the reformer 20, connect the reformer 20 and the evaporator 30 through the connection pipe 60 above the reformer 20 and the evaporator 30, and emit the combustion exhaust gas through a lower part of the evaporator 30. The connection pipe 60 is a metal pipe without a covering. Thus, radiant heat is released into the casing 50. As described above, this functions as a preheater for the cell stack 10 at the start of the operation and as a cooler for the cell stack 10 during the rated operation.

Meanwhile, the evaporator 30 in the casing 50 is thermally blocked by being surrounded by the heat-insulating material 52 different from the heat-insulating material 51 extending along the inner surface of the casing 50, thereby maintaining the operating temperature for the evaporator 30 at an optimum temperature of 600° C. or less below a temperature in the casing 50 (about 800° C.). As described above, in the evaporator 30, the existence of the air collecting plates 36 arranged in multiple layers in the cylindrical space 33 achieves efficient mixing and efficient heating of city gas and steam.

The aforementioned superiorities of the fuel cell module of this embodiment provide excellence not only in terms of size, but also overall operating performance including a startup time to the rated operation from the start of operation.

Figure 4:
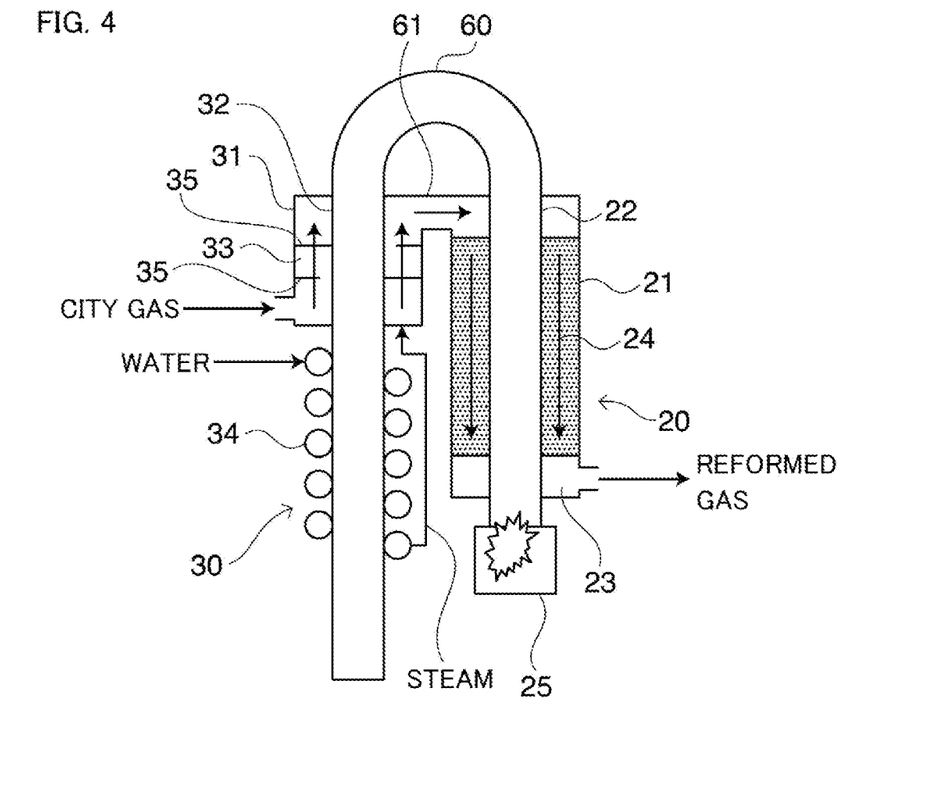
FIG. 4 shows a different structure of the auxiliary mechanism.

In the aforementioned embodiment, the water-supply tube 34 in the evaporator 30 has an internal fit structure inserted into the central portion of the inner tube 32 from above. Alternatively, as shown in FIG. 4, the water-supply tube 34 may be a spiral tube arranged below the outer tube 31 and attached to the outside of the inner tube 32. The spiral water-supply tube 34 is configured to receive water supplied from an upper end thereof and supply resultant steam through its lower end portion into the lower end portion of the cylindrical space 33 between the outer tube 31 and the inner tube 32. To suppress the height of the evaporator 30, the length of the outer tube 31 is reduced to reserve space for attachment of the spiral water-supply tube 34 below the outer tube 31.

An external fit structure in tandem arrangement of arranging the spiral water-supply tube 34 below the outer tube 31 and attaching the water-supply tube 34 to the outside of the inner tube 32 provides excellent safety as a break that may occur in the water-supply tube 34 does not cause a risk of leakage of water into the inner tube 32 or into the cylindrical space 33 between the outer tube 31 and the inner tube 32. The outer tube 31 is shortened and the height of the cylindrical space 33 between the outer tube 31 and the inner tube 32 is reduced for suppression of height. Meanwhile, the spiral water-supply tube 34 can be increased in length compared to its height, so that the water-supply tube 34 can be controlled at a small height. Thus, forming the water-supply tube 34 in the external fit structure in tandem arrangement does not cause any adverse effect mechanically.

Figure 5:
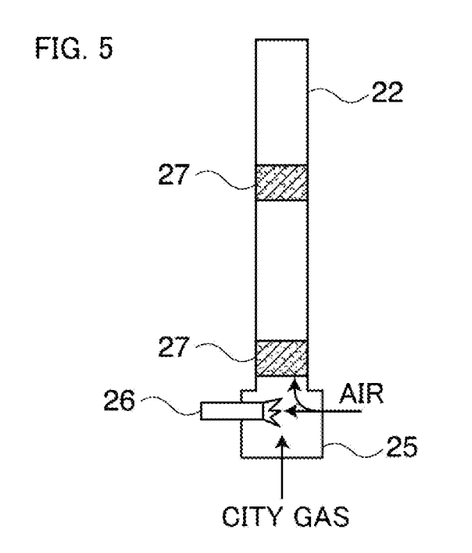
FIG. 5 shows a still different structure of the auxiliary mechanism and shows an internal tube structure of a reformer.

As shown in FIG. 5, for stable ignited combustion, the combustion unit 25 of the reformer 20 may have an ignition plug provided with an igniter 26 such as an ignition heater. More specifically, the combustion unit 25 employs a two-stage combustion system with a preliminary combustion part easy to ignite and having a low air ratio (high concentration of city gas) and a full combustion part. The preliminary combustion part is formed by supplying city gas (13A) and part of air to the igniter 26 at the start of the operation. The full combustion part is to produce full combustion under an original air ratio or lean combustion under the original air ratio or higher by adding the residual air to a flame generated in the preliminary combustion part.

To stabilize the ignited combustion, a flame holding part 27 made of an air-permeable incombustible material such as foam ceramic or metal is provided in a most bottom portion of the inner tube 32 above the combustion unit 25 so as to be located directly above the full combustion part. The flame holding part 27 is further provided in an intermediate portion of the inner tube 32. The former flame holding part 27 becomes red hot with combustion exhaust gas from the full combustion part below this flame holding part 27 to contribute to stable combustion in the combustion unit 25. The latter flame holding part 27 functions to accumulate and keep heat and transmits the heat energy of the combustion exhaust gas to the catalyst 24 in the reformer 20.

In the aforementioned embodiment, regarding the structure of the combustion exhaust gas pipe for heating the reformer 20 and the evaporator 30, specifically the combustion exhaust gas pipe providing the exhaust gas flow path inside thereof, for letting the combustion exhaust gas flow in a vertical direction, this combustion exhaust gas pipe is formed of the inner tubes 22 and 32 each having a double tube structure and has an internal fit structure arranged inside the reformer 20 and the evaporator 30. Alternatively, this combustion exhaust gas pipe may have an external fit structure arranged outside the reformer 20 and the evaporator 30 in a way that allows heat exchange with the reformer 20 and the evaporator 30. However, it is actually preferable that the combustion exhaust gas pipe be formed of the inner tubes 22 and 32 each having a double tube structure for the structural superiorities described above. Letting the combustion exhaust gas pass through in a vertical direction means letting the combustion exhaust gas go up from the bottom to the top or go down from the top to the bottom. Flow of the combustion exhaust gas is not limited to a straight line and includes a spiral pattern, for example.

This invention is not limited to the embodiment described so far. As an example, while the aforementioned embodiment relates to a solid electrolyte (SOFC type) fuel cell, this invention is further applicable to a fuel cell system of a different type such as an MCFC type fuel cell or a PEFC type fuel cell.

REFERENCE SIGNS LIST

10 Cell stack
11 Body
12 Casing
13 Reformed gas inlet
14 Air inlet
15 Reformed gas outlet
16 Air outlet
17 Connection pipe
20 Reformer
21 Outer tube
22 Inner tube
23 Cylindrical space
24 Catalyst
25 Combustion unit
26 Igniter
27 Flame holding part
30 Evaporator
31 Outer tube
32 Inner tube
33 Cylindrical space
34 Water-supply tube
35 Gas collecting plate
36 Air hole
37 Connection pipe
40 Heat exchanger
41 Air flow path
42 Exhaust gas flow path
43 Exhaust gas emission tube
44 Air inlet tube
45 Air emission tube
50 Casing
51, 52 Heat-insulating material
60, 61 Connection pipe

The invention claimed is:

1. A fuel cell module comprising: a cell stack formed by stacking plate-like cells in a thickness direction each considered as one unit;
   a reformer to generate hydrogen-rich reformed gas to be supplied to the cell stack by using exhaust gas as a heat source resulting from combustion of off-gas released from the cell stack;
   an evaporator to generate steam for the reforming; and
   a heat exchanger to preheat oxidized gas to be supplied to the cell stack by using the combustion exhaust gas,
   the cell stack, the reformer, the evaporator, and the heat exchanger being accommodated together in a casing, wherein
   the reformer and the evaporator are formed as vertical structures independently juxtaposed to each other in a depth direction and are disposed adjacent to the cell stack,
   exhaust gas flow paths respectively are disposed to the reformer and the evaporator so as to let the combustion exhaust gas pass through in a vertical direction for heating the reformer and the evaporator,
   the exhaust gas flow paths are connected in series through a connection pipe above the reformer and the evaporator, and
   the reformer is disposed on an upstream side relative to the evaporator in a flow direction of the combustion exhaust gas and the combustion exhaust gas goes up in the exhaust gas flow path disposed to the reformer while the evaporator is disposed on a downstream side relative to the reformer in the flow direction and the combustion exhaust gas goes down in the exhaust gas flow path disposed to the evaporator.

2. The fuel cell module according to claim 1, wherein said connection pipe is a bare pipe without a covering.

3. The fuel cell module according to claim 1, wherein said connection pipe has an inverted U shape with a curve projecting upward.

4. The fuel cell module according to claim 1, wherein the evaporator is thermally insulated partially in the casing with a dedicated heat-insulating material.

5. The fuel cell module according to claim 1, wherein the reformer and the evaporator each have a double tube structure including an inner tube and an outer tube arranged outside the inner tube in a concentric pattern while cylindrical space is formed between the inner tube and the outer tube, the inner tube providing the exhaust gas flow path inside thereof, for letting the combustion exhaust gas flow in a vertical direction.

6. The fuel cell module according to claim 5, wherein a water-supply tube through which water is supplied into said cylindrical space in the evaporator is a spiral tube arranged below the cylindrical space and attached to the outside of the inner tube.

7. The fuel cell module according to claim 5, wherein a plurality of air collecting plates with flange shape are arranged in multiple layers in the cylindrical space formed between the inner tube and the outer tube in the evaporator, the air collecting plates each having an air hole provided in a part of an inner circumferential area thereof in a circumferential direction, the air collecting plates being arranged such that each air hole is displaced stepwise in the circumferential direction.

8. The fuel cell module according to claim 1, wherein the heat exchanger is disposed below the reformer and the evaporator to use the combustion exhaust gas emitted from the evaporator as a heat source.

9. The fuel cell module according to claim 8, wherein the heat exchanger is arranged to fit into a recess formed by reducing the thickness of a part of a heat-insulating material extending along an inner surface of a bottom plate of the casing.

10. The fuel cell module according to claim 8, wherein the heat exchanger is a thin-laminated type where air flow paths and exhaust gas flow paths formed like horizontal planes respectively are stacked alternately and the heat exchanger is configured to heat air introduced into the heat exchanger by concurrent and countercurrent heat exchange with the combustion exhaust gas flown into the heat exchanger from a direction of the evaporator.

11. The fuel cell module according to claim 10, wherein a fluid flow path in the bottom layer of the heat exchanger is the air flow path.

12. The fuel cell module according to claim 6, wherein a plurality of air collecting plates with flange shape are arranged in multiple layers in the cylindrical space formed between the inner tube and the outer tube in the evaporator, the air collecting plates each having an air hole provided in a part of an inner circumferential area thereof in a circumferential direction, the air collecting plates being arranged such that each air hole is displaced stepwise in the circumferential direction.

13. The fuel cell module according to claim 9, wherein the heat exchanger is a thin-laminated type where air flow paths and exhaust gas flow paths formed like horizontal planes respectively are stacked alternately and the heat exchanger is configured to heat air introduced into the heat exchanger by concurrent and countercurrent heat exchange with the combustion exhaust gas flown into the heat exchanger from a direction of the evaporator.

14. The fuel cell module according to claim 10, wherein a fluid flow path in the bottom layer of the heat exchanger is the air flow path.

15. The fuel cell module according to claim 1, wherein the reformer is disposed on an upstream side relative to the evaporator in a flow direction of the combustion exhaust gas and the combustion exhaust gas goes up in the exhaust gas flow path disposed to the reformer while the evaporator is disposed on a downstream side relative to the reformer in the flow direction and the combustion exhaust gas goes down in the exhaust gas flow path disposed to the evaporator, and the reformer and the evaporator each have a double tube structure including an inner tube and an outer tube arranged outside the inner tube in a concentric pattern while cylindrical space is formed between the inner tube and the outer tube, the inner tube providing the exhaust gas flow path inside thereof, for letting the combustion exhaust gas flow in a vertical direction.

16. The fuel cell module according to claim 15, wherein a water-supply tube through which water is supplied into said cylindrical space in the evaporator is a spiral tube arranged below the cylindrical space and attached to the outside of the inner tube.

17. The fuel cell module according to claim 1, wherein the reformer is disposed on an upstream side relative to the evaporator in a flow direction of the combustion exhaust gas and the combustion exhaust gas goes up in the exhaust gas flow path disposed to the reformer while the evaporator is disposed on a downstream side relative to the reformer in the flow direction and the combustion exhaust gas goes down in the exhaust gas flow path disposed to the evaporator, and the heat exchanger is disposed below the reformer and the evaporator to use the combustion exhaust gas emitted from the evaporator as a heat source.

18. The fuel cell module according to claim 17, wherein the heat exchanger is arranged to fit into a recess formed by reducing the thickness of a part of a heat-insulating material extending along an inner surface of a bottom plate of the casing.

19. The fuel cell module according to claim 18, wherein the heat exchanger is a thin-laminated type where air flow paths and exhaust gas flow paths formed like horizontal planes respectively are stacked alternately and the heat exchanger is configured to heat air introduced into the heat exchanger by concurrent and countercurrent heat exchange with the combustion exhaust gas flown into the heat exchanger from a direction of the evaporator.

\* \* \* \* \*